United States Patent Office 2,963,160
Patented Dec. 6, 1960

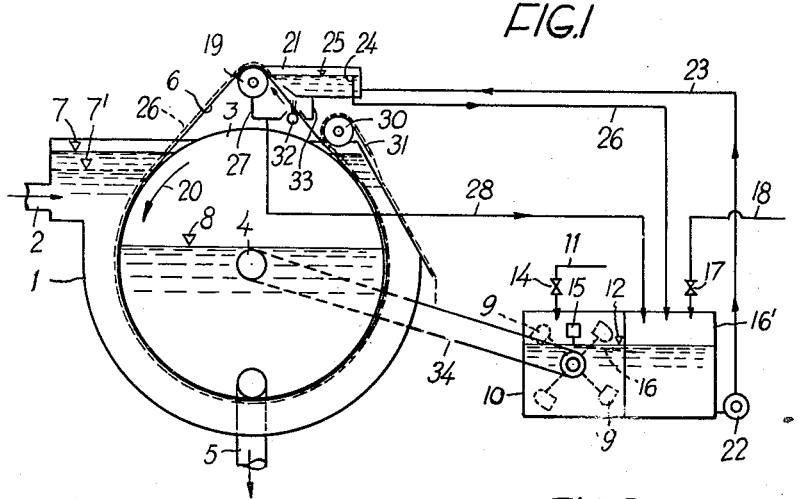
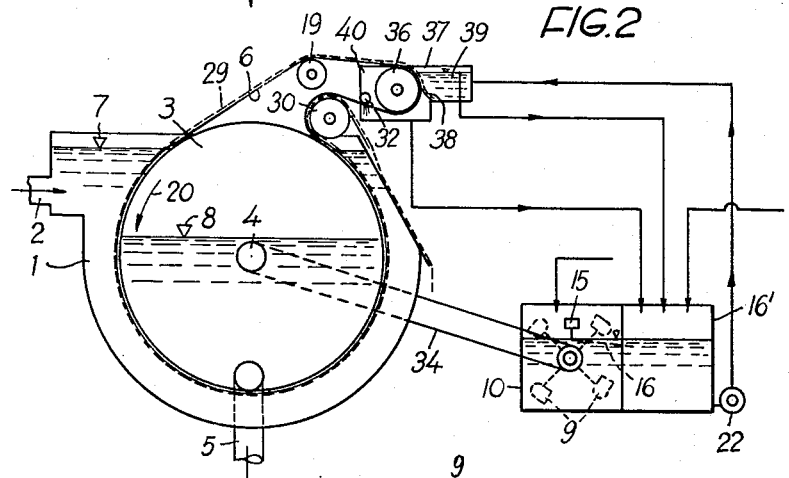

2,963,160
MEANS FOR PRODUCING FILTER LAYERS ON FILTER BANDS

Olov Carl Gustav Wennberg, Karlstad, Sweden, assignor to General Engineering Company AB, Stocksund, Sweden, a corporation of Sweden Filed Apr. 15, 1957, Ser. No. 652,721

Claims priority, application Sweden Apr. 25, 1956

4 Claims. (Cl. 210—193)

The present invention refers to such filtering means wherein a filtering layer, the filter layer, on a filter band is utilized to filter a liquid containing particles of one kind or another to be separated or collected. The filter layer is generally obtained from a fiber suspension supplied to the filter band consisting of wire gauze, for example. The invention refers in particular to filter layers on endless filter bands in drum filters but is also applicable to drum filters with a fixed filter cloth.

The thickness of the filter layer may be subjected to variations depending on alterations in the speed of the filter band and/or in the inlet level of the liquid to be filtered relatively to the outlet level in the filtering contrivance. At a high speed of the filter band, the filter layer may become too thin and cause an impaired filtering effect, whereas at a low speed the filter layer might become too thick, so that the filtering operation requires too long a time. Analogously, a greater level difference of the entering liquid in comparison with the escaping liquid brings about a thicker filter layer than does a lesser level difference. The invention aims at facilitating the production of a filter layer which is constant independently of variations in the speed of the filter band and independently of said level difference, respectively.

The distinguishing feature of the invention resides, above all, in that the concentration of the filter liquid, such as a suspension of fibers, to form the filter layer on the filter band is varied in dependence on the speed of the filter band in the liquid to be filtered, so that the filter layer remains at least approximately constant in thickness independently of variations in the speed of the filter band. Alternatively, said concentration may be varied in dependence on the difference in level between the entering liquid to be filtered, on one hand, and the filtered liquid in the filtering contrivance, on the other hand.

An apparatus for carrying the invention into effect may consist of a dispensing device for a suspension for the formation of a filter layer, said dispensing device being driven from the filter band or from any part driving the same or running along therewith. In a drum filter, the driving part may consist of the shaft of the filter drum. Instead, it may consist of the axle of a guide roller having the filter band running over the same.

According to a further development of the invention, the thickness of the filter layer may be adjusted to a predetermined value, for instance by means of a suitable control member on the dispensing device. This control member may consist of a damper or a valve, which in accordance with its adjustment admits the passage of a greater or smaller quantity of filter-layer-forming liquid to the filter band.

A few examples of applying the invention in drum filters are illustrated in the drawing, wherein Figs. 1 and 2 severally show a form of embodiment in vertical section and by way of diagrammatic representation, whereas Fig. 3 shows a detail of a projection at right angles to said section.

In the drawing, 1 designates a filter vat of a drum filter, said vat having an inlet 2 for liquid to be filtered; 3 denotes a filter drum on a shaft 4, and 5 represents an outlet for filtered liquid mounted in a stationary end wall sealed at the circumference of the drum, while an endless filter band running over the filter drum is designated by 6. The liquid level is denoted by 7 in the vat 1 and by 8 in the drum 3.

A dispensing device consisting of a wheel with buckets 9 in a container 10 is provided with a supply conduit 11 for a relatively concentrated fiber suspension, the level of which in the container 10 is designated by 12. The conduit 11 is provided with a cut-off valve 14. The buckets empty their contents into a drainage vessel 15, from which a pipe 16 leads into a mixing vat $16^1$, wherein the filter-layer-forming fiber suspension attains the desired concentration. Water may be supplied to the vat $16^1$ through a supply conduit 18 provided with a valve 17.

In the embodiment shown in Fig. 1, the filter band 6 runs from the filter drum over a single guide roller 19. The filter drum rotates in the direction indicated by the arrow 20, and the portion of the filter band ascending from the drum forms the bottom of a supply box 21, to which the fiber suspension is conveyed by means of a pump 22 from the mixing vat $16^1$ through a conduit 23. A spillway 24 keeps the fiber suspension in the box 21 at a constant level 25, and the surplusage is drained off the box 21 back to the mixing vat $16^1$ through a conduit 26. The filter-layer-forming contrivance comprises, in addition to the supply box 21, a collecting box 27 on the lower side of the filter band underneath the supply box, and from the collecting box the filtrate is returned from the filter-layer-formation to the mixing vat $16^1$ through a conduit 28.

When the filter band passes underneath the box 21, a filtering layer 29 forms on the filter band by the fibers contained in the fiber suspension in the box, and this filtering layer serves in a known manner as a filter for the liquid in the vat 1. The filtering layer and the particles deposited thereon during the passage through the vat are transferred to a discharge roller 30 and are scraped off the latter by means of a doctor 31. The portion of the filter band ascending from the point of removal of the filtering layer is flushed clean by means of a spray pipe 32, collection of the filter particles taking place in a box 33.

In order that the filter layer 29 on the band shall attain a constant thickness, even if the liquid level 7 should vary, for instance sink to a minimum level 7', if the speed of the drum should vary, the concentration of the filter-layer-forming fiber suspension is caused to vary independence on said level or on the speed of the drum. To this end, the wheel with the buckets 9 is driven from the shaft 4 of the drum. The driving means is indicated in the drawing as an endless driving band or chain 34 running over the shaft 4 and the bucket wheel. Instead, the driving band could run over the guide roller 19 or the axle thereof.

If for some reason or another the rotational speed of the drum 3 should increase (with sinking of the level 7 as a consequence), so that the thickness of the filter layer 29 would tend to decrease, the bucket wheel will by reason of the driving band rotate at an increased speed. The drainage vessel 15 is then traversed by a greater number of buckets 9 per unit of time, so that an increased quantity of concentrated fiber suspension is supplied to the mixing vat $16^1$. The concentration of the fiber suspension in the vat is thus increased, so that a more concentrated fiber suspension will be pumped up to the box 21. A thicker fiber layer will therefore be applied to the filter band in this box. Obviously, the dispensing device or the driving members of the same may be adapted so that the filter layer 29 remains constant.

If it is desired to alter the thickness of the filter layer 29, this may be effected by controlling the quantity of fiber suspension supplied to the mixing vat 16¹. A device for this purpose is indicated in Fig. 3 in the form of a slide valve 35 over the opening of the drainage vessel 15. Accordingly as the slide value is pushed in over the opening, the quantity of fiber suspension supplied to the mixing vat decreases, the concentration of the suspension conveyed upwardly by the pump 22 then also decreasing. Under otherwise unchanged conditions, this brings about a reduction of the thickness of the filter layer 29. In a corresponding way uncovering of the opening of the drainage vessel by the slide valve being pulled out brings about an increase of the thickness of the filter layer 29.

The embodiment shown in Fig. 2 differs from that now described only by the arrangement for applying the filter layer 29 onto the filter band. Here, there is provided, in addition to the guide roller 19, a smaller filter drum 36, over which runs the portion of the filter band which is free from the main drum 3.

The filter drum 36 rotates in an applying vat 37 corresponding to the box 21 in Fig. 1, and this vat is divided into an inlet chamber 39 and an outlet chamber 40 by a tightening ledge 38 bearing on the drum 36. The filter layer 29 is formed on a portion of the filter drum 36 facing the chamber 39, when the filter band moves past this portion. The filter layer then follows with the filter band past the guide roller 19 and down round the periphery of the large filter drum 3 in the filter vat 1.

The variation of the concentration of the filter-layer-forming liquid in the mixing vat 16¹ by means of the dispensing device 9, 15 is effected in the construction according to Fig. 2 in the manner described in connection with Fig. 1.

The invention is not limited to the embodiments shown and described.

What I claim is:

1. An apparatus for filtering liquids from particles contained therein, comprising a filter band, means to move the filter band, means to admit the liquid to be filtered to one side of the filter band, means to remove the filtered liquid from the other side of the filter band, means to continuously supply a suspension of fibers in a liquid to the former side of the filter band to form a filtering layer of fibers on said side before admitting the liquid to be filtered thereto, and means to adjust the concentration of said filter-layer-forming suspension to maintain a substantially constant thickness of the filtering layer on the filter band in spite of variations of the speed of the filter band, said adjusting means comprising a dispensing device for supplying a controlled fiber suspension to said supplying means, said dispensing device comprising means to adjust the supplied quantity of controlled fiber suspension to obtain a filtering layer of a predetermined thickness.

2. An apparatus for filtering liquids from particles contained therein, comprising a vat having an inlet for liquid to be filtered, a rotary perforate drum mounted to rotate in said vat, an endless filter band running over said drum, means to continuously apply a filtering layer of fibers to the filter band from a suspension of fibers in a liquid, a dispensing device for adjusting the concentration of the suspension, said dispensing device being operably coupled to the drum and comprising a bucket wheel provided with buckets for lifting and feeding the suspension, a drainage vessel for concentrated fiber suspension fed by said bucket wheel, a mixing chamber communicating with said drainage vessel, and means to adjust the supplied quantity of controlled fiber suspension.

3. An apparatus as claimed in claim 2 and further comprising a conduit extending from said mixing chamber to the means applying the filtering layer to the filter band, said latter means comprising a box having a portion of the filter band forming a side thereto.

4. An apparatus as claimed in claim 2, in which the means applying the filtering layer to the filter band comprises a filter drum having a smaller diameter than the filter drum mounted in the vat, the filter band running over both of said drums, a box forming an inlet chamber for the suspension at a portion of the filter band running over the small drum, and a conduit extending from said mixing chamber to said inlet chamber to feed fiber suspension to the box.

References Cited in the file of this patent

UNITED STATES PATENTS

| | | |
|---|---|---|
| 1,946,663 | Behnke | Feb. 13, 1934 |
| 2,046,845 | Raisch | July 7, 1936 |
| 2,055,869 | Manning | Sept. 29, 1936 |
| 2,102,780 | Biefeldt | Dec. 21, 1937 |
| 2,534,760 | Ellila | Dec. 19, 1950 |
| 2,576,288 | Fink | Nov. 27, 1951 |
| 2,679,936 | Bench | June 1, 1954 |